April 23, 1940.     W. J. MAYER     2,198,579
ILLUMINATION SYSTEM
Original Filed April 14, 1934     2 Sheets-Sheet 1

INVENTOR.
WILLIAM J. MAYER.
BY *John P. Tarbox*
ATTORNEY.

April 23, 1940.  W. J. MAYER  2,198,579
ILLUMINATION SYSTEM
Original Filed April 14, 1934   2 Sheets-Sheet 2

INVENTOR.
WILLIAM J. MAYER.
BY John P. Tarbox
ATTORNEY.

Patented Apr. 23, 1940

2,198,579

UNITED STATES PATENT OFFICE 2,198,579

ILLUMINATION SYSTEM

William J. Mayer, Glenside, Pa., assignor to Edward G. Budd Manufacturing Company, Philadelphia, Pa., a corporation of Pennsylvania Application April 14, 1934, Serial No. 720,534
Renewed February 14, 1938

11 Claims. (Cl. 240—7.35)

The invention relates to vehicles and more particularly to the interior illumination thereof, and has for one of its principal objects the attainment of a soft uniformly diffused illumination throughout the interior of the vehicle body, whereby to provide substantially unbroken interior surfaces free of lighting fixtures, while attaining illumination at substantially all points of the car such as to be substantially free of detrimental effects from localized obstructional elements.

Among other objects of my invention are the elimination of projecting lighting fixtures and its consequent bright light sources; the provision of a major lighting by indirect means and a minimum of quasi-direct lighting; further objects of the invention are to avoid localized bright spots upon the central ceiling structure; another object of the invention resides in a diffused lighting such that persons standing in the aisles of the vehicle will not interfere with the illumination upon books or other articles being observed by passengers located in the seats. Other features are the reduction in the reflecting mediums to a small number of parts and their construction in a manner subject to ready replacement or repair and the provision of greater percentage of illumination in the seating zone and a smaller while yet sufficient illumination in the aisle.

My invention will be better understood from the following description when considered in connection with the accompanying drawings, wherein Fig. 1 is a transverse cross section of a vehicle incorporating the features of my invention.

Figure 1:
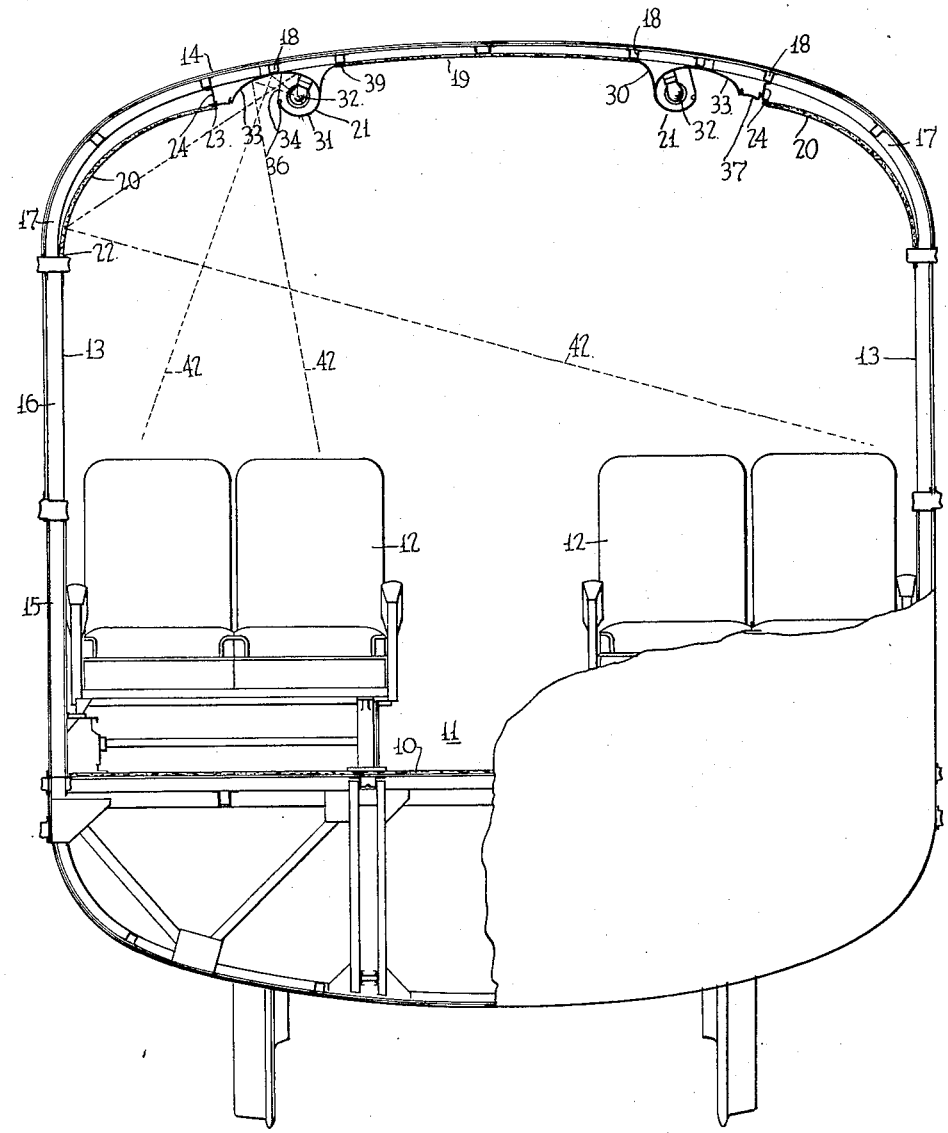

Considering the illustrated embodiment of my invention there is shown a transverse section of the interior of a vehicle, in this instance being a high speed rail vehicle of light weight, having a transversely extending floor member 10, the central area of which 11 comprises the aisle to either side of which are located the duplex individual seats 12, the enclosure being completed by the side walls 13 and roof structure 14. The side walls are of light weight hollow construction having an uninterrupted portion 15 broken at longitudinally spaced locations by window openings 16 and the entire structure having closed and open channel section members.

The roof structure 14 of the vehicle comprises box section channel members 17 completely defining the limiting elements of the vehicle structure. These members are spaced longitudinally and united by longitudinally extending box section members 18. The false or interior roof of the car comprises a central portion 19 and spaced arcuate side portions 20 and between these two portions the lighting ducts 21. The side portions 20 are positioned in their defining shape by connections at the points 22 and 23, the point 22 being with respect to the side wall structural elements and the point 23 with respect to a channel member 24 secured to one of the purlines 18. The arcuate interior roof portion 20 comprises a major diffusing surface for the indirect lighting arrangements and the lighting duct 21 comprising elemental parts provides the interiorly concealed housing for the light sources as well as the primary reflecting surfaces. This duct is preferably made up of elemental sheet metal parts, the part 30 defining the contour of the central roof structure above the aisle and completing the contour between the portion 19 and the lower wall 31 of the duct. Light sources 32 are positioned interiorly of this duct and spaced longitudinally thereof with respect to the seats and the candle power of the particular light sources is made appropriate to provide the necessary flux per unit area illumination in the seats. The duct is a substantially circular reflecting portion and the remaining portions and merging parts being of a compound or irregular surface curvature. The lower reflecting side wall 31 of the duct 21 is secured to the portion 33 at spaced intervals by reinforcing elements 34 in the nature of straps. These straps are preferably in the nature of divisional walls providing compartments if this is desired, and they have been found useful, giving a further diffused illumination by the throwing of side lighting effects from the light sources into the reflecting duct and down into the car at an angle.

The arrangement of the reflecting surfaces may be such that the central false roof structure 19 and 30 over the aisle is of materially reduced illumination providing a restful objective for the eyes without disturbing the effective interior illumination of the car. When it is desired to illuminate the central ceiling structure a composite arrangement of reflecting surfaces and a slight adjustment of direction of the open area of the reflecting surfaces may be utilized and thus obtain an arrangement wherein the ceiling above the aisle is illuminated as well as that above the seats and additional lateral as well as vertical flux distribution is attained.

Figure 2:
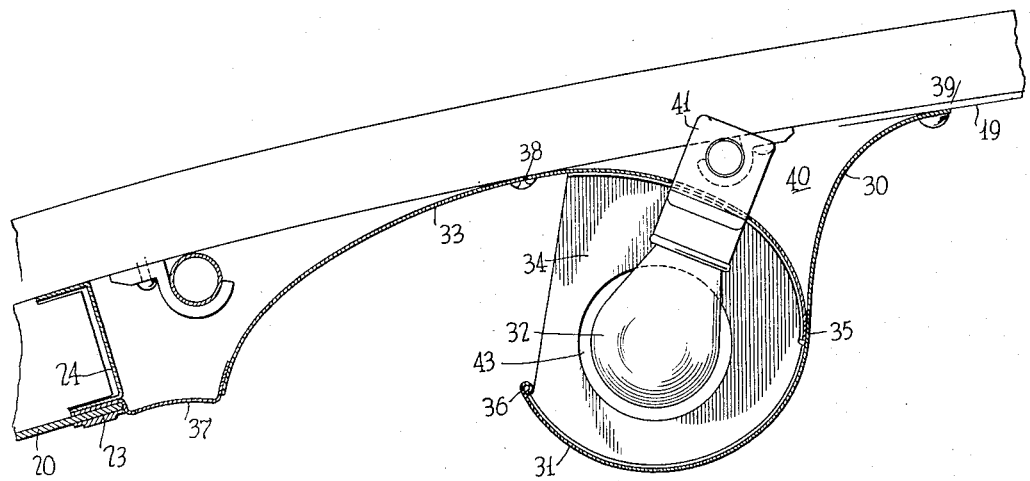
Fig. 2 is a detail section showing the arrangement of the reflecting surfaces and light sources.

The duct construction may be preferably of sheet metal, the portions 30 and 31 comprising an integral unitary ogee curve of proper contour. The parts 33 and 31 may likewise be an integral member having a nested secured portion coextensive with the zone between the points 35 and 36, the end structure 36 having a bead or other reinforcement of suitable nature. The connecting members 34 are of peripheral contour substantially the shape of the duct, as clearly seen in Fig. 2. To further provide ventilation and radiation of heat generated by the light sources, the members 34 may centrally be perforated or pierced to provide openings 43. These openings in addition to creating better ventilation of the light sources, provide further emission of light with regard to the reflecting surfaces so as to further diffuse the car illumination. The part 33 outwardly is made integral with a polished substantially channel-shaped member 37 which defines an ornamental boundary zone between the light source carrying reflecting duct 21 and the reflecting roof structure 20. The duct is secured in suitable manner, and for example, at the points 23, 38 and 39.

Figure 3:
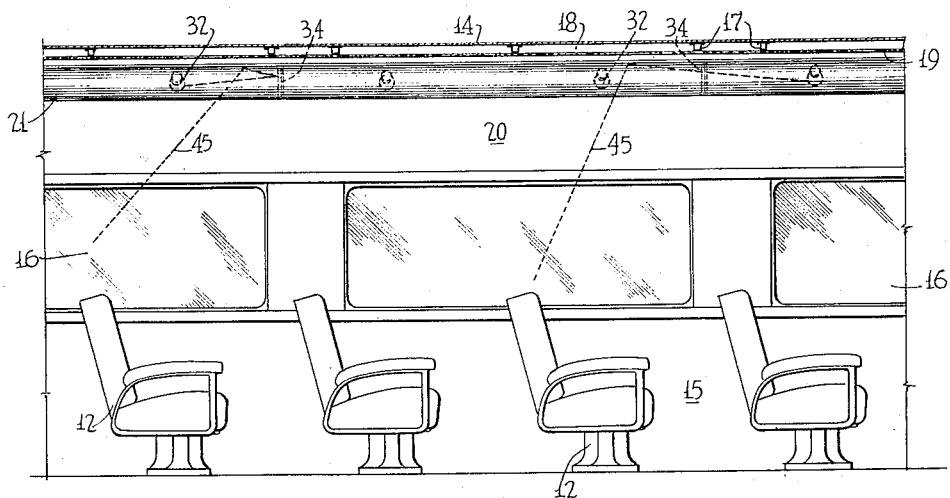
Fig. 3 is a transverse elevation along the lines 3—3 of Fig. 1 showing schematically the location of the light sources with respect to the seats and aisles and the illumination.

A further advantageous feature of the reflecting elements is the provision interiorly thereof without additional structure of a conduit portion 40 in which are carried the electrical cables, wiring and fixture securement parts. Inasmuch as the light sources and their lamp holders are entirely out of normal visual range of the passengers, these sockets 41 may be of the more common and economical type not requiring ornate ornamentation, and also arranged in a manner to allow the entire reflecting system to be removed merely by the removal of the lamps without interfering with the light source locations per se. The range of effective illumination is indicated transversely of the car by the schematic light wave traces 42 as to the aisle, seats under the reflectors and as to the opposite seat lights. In Fig. 3 the diffusing effect of the members 34 is shown by the light wave traces 45. Further, the arrangement of reflecting surfaces with relation to the locus of the curve comprising the interior reflecting surface materially adds to the effectiveness of the illuminating system.

Although by way of example I have illustrated a single embodiment of my invention it will be readily apparent that modifications within the true spirit and scope thereof are intended to be covered by the hereto appended claims.

What I claim is:

1. A reflector comprising a substantially spiral sheet metal surface and means disposed at spaced intervals transversely thereof providing diffusing surfaces transversely with respect to the substantially spiral reflector and having central openings therein, which spiral surface is adapted to house light sources intermediate said diffusing surfaces.

2. An interior illumination system for a vehicle body having a ceiling surface curved in transverse section, a reflector structure extending linearly along the ceiling and adjacent said curved surface, said reflector structure having a plurality of longitudinally spaced light supports therein and including a light source housing and reflecting portion spaced from the ceiling and intercepting and reflecting light from a light source in said light supports toward the ceiling, and a co-acting reflected light receiving portion having one extremity overlying the light source housing and reflecting portion, and the other extremity extending laterally beyond said light source housing and reflecting portion a substantial distance, the light supports supporting light sources in the housing and reflecting portion and between the housing and reflecting portion and the coacting reflected light receiving portion, said co-acting reflected light receiving portion reflecting light directly downwardly into the vehicle body laterally outwardly onto the curved ceiling portion.

3. An interior illumination system for a vehicle body having a curved ceiling surface, a longitudinally extending reflector structure adjacent said curved surface, said reflector structure having a plurality of longitudinally spaced light supports therein illuminating said reflector structure throughout its length, said reflector structure including a light source housing and reflecting portion spaced from the ceiling and intercepting and reflecting light from a light source in said light supports toward the ceiling, and a co-acting reflected light receiving portion having one extremity overlying the light source housing and reflecting portion, and the other extremity extending laterally beyond said light source housing and reflecting portion a substantial distance, said co-acting reflected light receiving portion intecepting some of the light reflected toward the ceiling and reflecting it into the vehicle body, and means to secure the light source housing and reflecting portion to a part of the ceiling structure of the vehicle body, a curved part of the reflector structure being spaced below the ceiling and leads to the respective light source supports extending between said curved part of the reflector structure and the ceiling structure.

4. An interior illumination system for a vehicle body having a curved ceiling surface, a longitudinally extending reflector structure adjacent said curved surface, said reflector structure having a plurality of longitudinally spaced light supports therein illuminating said reflector structure throughout its length, said reflector structure including a light source housing and reflecting portion spaced from the ceiling and intercepting and reflecting light from a light source in said light supports toward the ceiling, and a co-acting reflected light receiving portion having one extremity overlying the light source housing and reflecting portion, and the other extremity extending laterally beyond said light source housing and reflecting portion a substantial distance, said co-acting reflected light receiving portion intercepting some of the light reflected toward the ceiling and reflecting it into the vehicle body, and being of compound form with its outward extremity joining with the curved ceiling surface inwardly of the sides of the vehicle body, whereby the contour of the reflector structure is continuous with the curved ceiling surface, said co-acting reflected light receiving portion being inset beyond the curved ceiling surface and concentrating light downwardly, and said housing and reflecting portion presenting laterally of the vehicle body.

5. An interior illumination system for a vehicle body having a curved ceiling surface, a continuous reflector structure adjacent said curved surface, including a light source housing and reflecting portion spaced from the ceiling, a plurality of longitudinally spaced light supports adapted to have light sources therein to illuminate said continuous reflector structure, said light source housing and reflecting portion reflecting light from a light source in said light supports toward the ceiling, and a co-acting reflected light receiving portion having one extremity overlying the light source housing and reflecting portion, and the other extremity extending laterally beyond said light source housing and reflecting portion a substantial distance, said co-acting reflected light receiving portion reflecting light into the vehicle body, and a plurality of transverse apertured partitions within the reflector structure and between the light sources, such partitions interconnecting the respective parts of the reflector structure and serving to direct the light rays along the length of and against the reflector structure.

6. An interior illumination system for a vehicle body having a curved reflecting ceiling quarter surface adjacent the side walls, which includes a longitudinally extending spiral reflector structure arranged inwardly of said vehicle body with respect to said ceiling quarter surface, said reflector having a substantially closed bottom and side to intercept and reflect light from a light source therein and an open outer reflecting portion presenting outwardly and directly downwardly from the ceiling to reflect light into the vehicle body and to the ceiling quarter surface, means to mount light sources within the linear extent of the reflector and means to support the reflector structure from the ceiling of the vehicle body, said reflector structure being illuminated from end to end with a substantially uniform dispersion of light on the ceiling quarter surface.

7. An interior illumination system for a vehicle body having a curved reflecting ceiling quarter surface adjacent the side walls, which includes a longitudinally extending spiral reflector structure arranged inwardly of said vehicle body with respect to said ceiling quarter surface, said reflector having a substantially closed bottom and side to intercept and reflect light from a light source therein and an open outer reflecting portion presenting outwardly and downwardly from the ceiling to reflect light into the vehicle body and to the ceiling quarter surface, means to mount light sources within the linear extent of the reflector and means to support the reflector structure from the ceiling of the vehicle body, a portion of the co-acting reflector structure adjacent the open portion joining with the adjoining ceiling surface, and means defined by the reflecting structure, its support and the ceiling to receive the light source leads therein.

8. An interior illumination system for a vehicle body having a curved reflecting ceiling quarter surface adjacent the side walls, which includes a longitudinally extending spiral reflector structure arranged inwardly of said vehicle body with respect to said ceiling quarter surface, said reflector having a substantially closed bottom and side to intercept and reflect light from a light source therein and an open outer reflecting portion presenting outwardly and downwardly from the ceiling to reflect light into the vehicle body and to the ceiling quarter surface, means to mount light sources within the linear extent of the reflector, said light sources substantially uniformly illuminating said reflector, and means to support the reflector structure from the ceiling of the vehicle body, and apertured means within the reflector structure to reflect light along the length of the structure and to other parts of the structure for greater light dispersion.

9. In a railway or similar vehicle, an illumination system comprising an overhead indirect lighting reflector structure extending longitudinally of the vehicle symmetrical with the vehicle center line, a plurality of longitudinally arranged light sources within the structure, longitudinally extending transversely curved ceiling surfaces generally conforming to the carline contours adapted to reflect the light emanating from said sources and distribute it throughout the vehicle without glare, said sources of light being hidden by the lighting reflector structure from the direct view of vehicle occupants, the lighting reflector structure comprising a longitudinally extending substantially continuous reflector surface immediately adjoining said curved ceiling surfaces curved inwardly and downwardly of the inner extremity of said ceiling surfaces directing the light from said source, some of it directly downwardly free of said ceiling surfaces and some of it downwardly by way of said ceiling surfaces.

10. An illuminating system as in claim 9 in which the light reflected downward to illuminate the area thereunder is reflected predominately by the reflector structure and the remainder of the light is reflected by the curved ceiling surfaces to illuminate the remainder of the vehicle.

11. An interior illumination system for a vehicle body having a reflecting ceiling, said ceiling comprising a curved quarter surface portion adjacent the side walls, and substantially following the contour thereof, and a longitudinally extending curvilinear concave reflector portion arranged inwardly toward the center of said vehicle body with respect to said first-named quarter surface portion, said reflector portion having a substantially closed bottom and side to intercept and reflect substantially all downwardly directed light from a light source therein and an open outer reflecting portion extending outwardly and spaced from the ceiling to reflect light into the vehicle body and to the quarter surface portion, means to mount light sources within the linear extent of the reflector and means to support the reflector structure from the ceiling of the vehicle body, said reflector structure being illuminated from end to end with a substantially uniform dispersion of light on the ceiling quarter surface.

WILLIAM J. MAYER.